July 17, 1962  A. P. BIDART  3,044,366
MILLING TOOL
Filed May 11, 1959  2 Sheets-Sheet 1
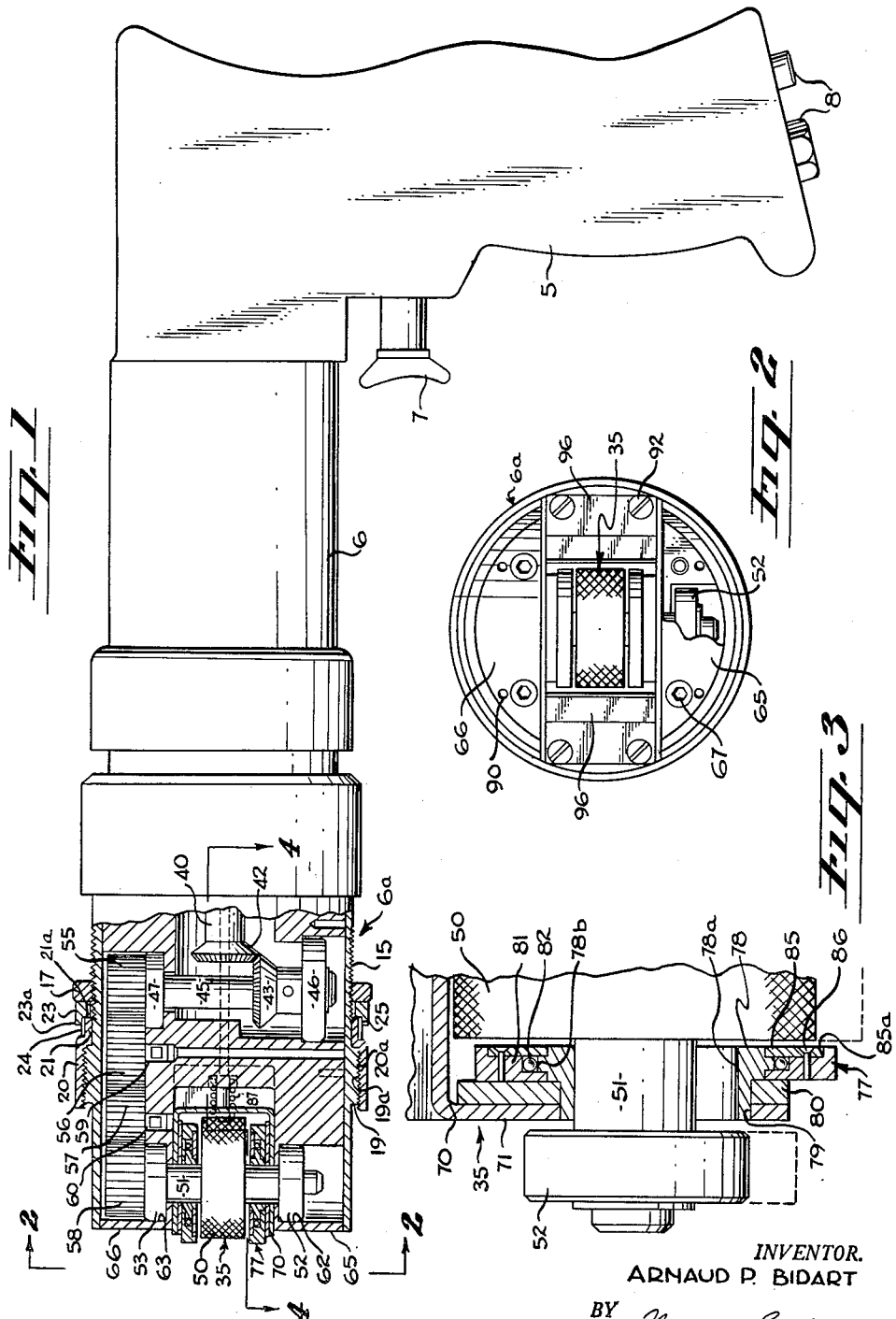
INVENTOR.
ARNAUD P. BIDART
BY Mason + Graham
ATTORNEYS

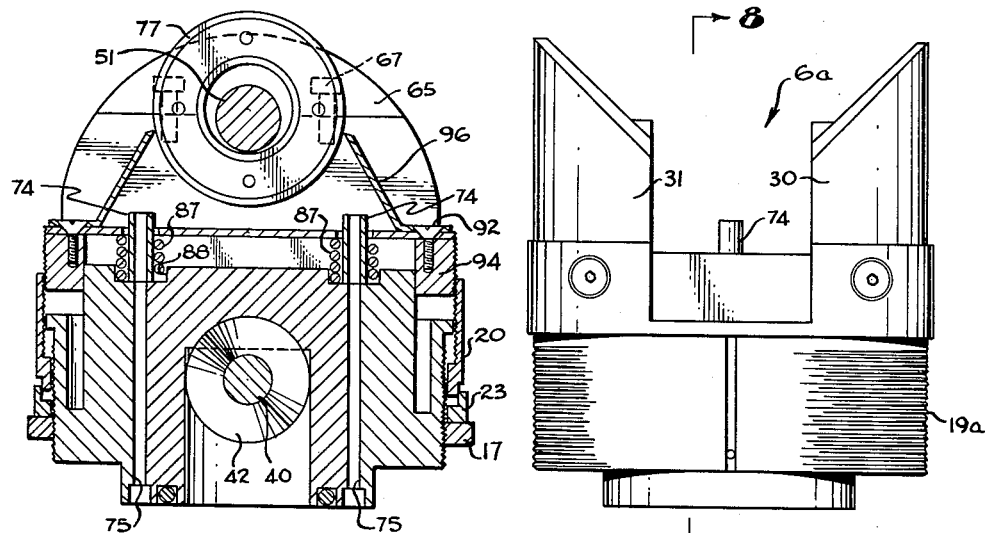
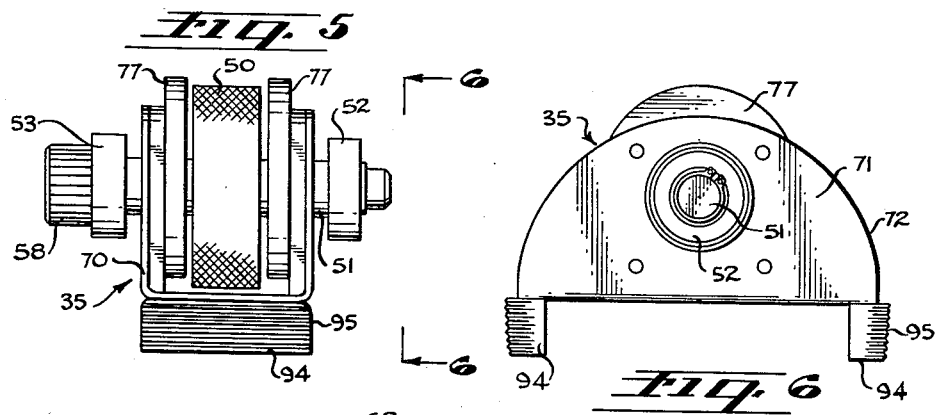
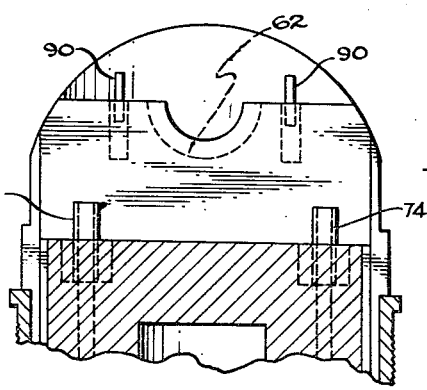

United States Patent Office 3,044,366
Patented July 17, 1962

3,044,366
MILLING TOOL
Arnaud P. Bidart, Los Angeles, Calif., assignor to Zephyr Manufacturing Co., Inglewood, Calif., a copartnership
Filed May 11, 1959, Ser. No. 812,464
6 Claims. (Cl. 90—12)

This invention generally relates to the art of milling tools and has to do more particularly with tools of the "shaver" type which are peculiarly suited for machining off elongated protuberances, such as weld beads, on work surfaces.

In such a tool it is important to employ, in cooperation with the milling cutter, a pair of guide rollers, one at each side of the cutter, for guiding the cutter as well as for adjustably limiting the depth of the cut effected by the cutter. So as properly to perform their function of adjustably limiting the depth of the cut, it is necessary that the axes of the cutter and guide rollers be maintained parallel and that those axes be adjustable towards and away from each other. And, to insure a proper machining operation, it is important that the guide rollers operate about a common axis in any position of adjustment relative to the cutter.

I am aware that others have proposed milling tools having adjustable guide rollers in conjunction with a cutting tool, but, so far as I am aware, the guide rollers in those devices have been so mounted that they must be adjusted independently of each other relative to the cutter. Consequently, those devices require considerable time to effect the adjustment and such independent adjustment is apt to result in an improper machining operation because of failure to adjust the guide rollers into true coaxial relationship.

It is therefore an object of my invention to provide a milling tool peculiarly suited for shaving off protuberances on work surfaces, which tool incorporates novel and highly efficient means for simultaneously effecting adjustment of both guide rollers relative to the axis of the cutter while at all times maintaining the guide rollers in true axial alignment.

Another object is to provide, in a tool of this character, novel means for presetting the tool to predetermine the depth of cut to be made by the cutter.

It is a further object to provide in a milling tool of this character, a novel arrangement and combination of parts for the accomplishment of the above-mentioned objects.

Additional objects and corresponding advantages will appear hereinafter.

While my invention is susceptible of modification within the purview of the appended claims, I shall, for the purpose of enabling those skilled in the art to understand and practice my invention, now describe in detail the best construction and arrangement of parts which I have thus far devised for carrying my invention into practice, for which purpose I shall refer to the accompanying drawings wherein:

FIG. 1 is a view partly in side elevation and partly in medial longitudinal section;

FIG. 2 is an end view taken on line 2—2 of FIG. 1;

FIG. 3 is an enlarged fragmentary view partly in section and partly in elevation;

FIG. 4 is an enlarged sectional view taken on line 4—4 of FIG. 1;

FIG. 5 is an enlarged elevational view showing the guide roller mounting in relation to the cutter and the cutter shaft;

FIG. 6 is an elevational view taken on line 6—6 of FIG. 5;

FIG. 7 is an enlarged side elevation with the parts shown in FIGS. 5 and 6 removed; and FIG. 8 is a reduced section taken on line 8—8 of FIG. 7.

Referring now to the drawing, I show a hand manipulatable tool of the "gun" type comprising a handle portion 5, a body portion 6 including a suitable driving motor, not shown, such as a conventional air motor, a manual control member 7 for controlling the air supply, and fittings 8 for connection to the air supply.

The body has an outer end portion 6a which is externally threaded at 15 to threadedly receive a lock nut 17 for the purpose to be hereinafter described, and said bottom end portion also has a relatively large diameter portion 19 externally threaded at 19a to threadedly receive the internally threaded portion 20a of an adjustable sleeve 20. The portion 19 and the threads 19a are interrupted at diametrically opposite points to the extent of the spacing between the bifurcations to be hereinafter described. The inner end 21a (the right end in FIG. 1) of the reduced diameter portion 21 of the sleeve 20 is disposed to be engageable against a lock ring 23. The exterior of the portion 21 of the sleeve is splined at 24 and the lock ring 23 has an annular, depending, relatively large diameter portion 23a which has internal splines 25 engageable between the splines 24.

The bottom end portion of the body presents bifurcations 30, 31 (FIG. 7) between which a guide roller carrier or housing, generally denoted 35 (FIGS. 1, 3, 5 and 6) is resiliently mounted for telescopic movement relative to the bifurcations.

As best shown in FIG. 1, a motor drive shaft 40 is disposed axially of and journaled in the body 6, carrying a beveled gear 42 on its bottom end. Gear 42 meshes with a beveled gear 43 secured on a shaft 45 journaled in bearings 46, 47 in the body.

The shaft 45 is operatively connected to the cutter 50, secured on shaft 51 and journaled in bearings 52, 53 by a gear train consisting of gears 55, 56, 57, and 58, the latter gear being secured on the shaft 51. Gears 56, 57 are carried on idler shafts 59, 60, respectively, mounted in the body.

The bearings 52, 53 are mounted in aligned openings 62, 63 provided in the bifurcations 30, 31. That is, one-half of the respective openings is provided in the outer end portions of the respective bifurcations, while the other half of the respective openings is provided in retainer members 65, 66, which retainer members are secured to the outer ends of the respective bifurcations by screws 67 (FIG. 2).

Thus the cutter is at all times rotated about a fixed axis disposed diametrically of the body.

The guide roller carrier 35 comprises a U-shaped yoke member 70 each of whose sides 71 has an arcuate bottom edge 72 (FIG. 6). The side portions 71 slidably fit between the bifurcations 30, 31.

Tubular members 74 (two in number), communicate at their inlet ends with the exhaust from the air motor within the body through passageways 75 and project through enlarged openings in the cross or top portion of the carrier 35, so as to discharge air under pressure against the periphery of the cutter 50 to maintain the cutter free of metal cuttings.

The guide roller carrier 35 carries a pair of guide rollers 77, one on each side of the cutter. Each guide roller has the same external diameter as the cutter and is rotatably supported by the carrier in the following manner: a hub 78 having a bore 78a, through which the cutter shaft 51 rotatably extends, is secured in an opening 79 in each side portion 71 of the carrier. Each bore 78a is of substantially larger diameter than the cutter shaft—the difference in diameter defining the extent of adjustability of the rollers relative to the cutter. A spacer bracket 80 is force fitted on the carrier. Each hub 78 has a relatively large diameter inner end portion 78b whose peripheral surface forms one surface of a bearing race 81 carrying ball bearings 82. The roller 77 forms the remaining surfaces of the bearing race. The balls 82 are prevented from escaping from the race by a ring 85 secured in a recess 85a in the inner surface of each roller as by screws 86 (see FIG. 3).

The purpose of having the bore 78a of each hub 78 of larger diameter than the cutter drive shaft is to enable the axis of rotation of the guide rollers to be adjusted relative to and in parallel relation to the cutter shaft, as will be more particularly pointed out hereinafter.

The guide roller carrier 35 slidably fits between the bifurcations 30, 31 and is resiliently urged outwardly between the bifurcations by a pair of coil springs 87 disposed around the respective tubular members 74 and interposed between the top end of the guide roller carrier 35 and the bottom or outer end portion of the body 6a, the top ends of the springs fitting in recesses 88 in the body as best shown in FIG. 4.

A pair of pilot pins 90 are carried by and project from the outer end portion of the body and engage in corresponding holes in the retainer members 65, 66 (FIG. 2).

My presently preferred means of adjusting the guide roller carrier relative to the bifurcations is to secure to the top of the carrier 35, as by screws 92, a pair of diametrically aligned threaded segments 94, whose threads 95 engage the internal threads 20a of sleeve 20. Thus, inasmuch as the segments 94 are held against rotation by the carrier 35, rotation of the sleeve 20 will move the carrier between and relative to the bifurcations; as best shown in FIG. 4, a pair of angle iron guards 96 are secured to the carrier 35 by screws 92 to partially shield the periphery of the cutter.

In assembling the device, the cutter, cutter shaft, and its bearings are assembled in the carrier and, before the retainer members 65, 66 are installed, the carrier, with the carrier cutter assembly, is inserted between the bifurcations 30, 31 and the bearings 52, 53 are dropped into the parts of the opening 63 which are formed in the outer ends of the bifurcations.

Retainer members 65, 66 are then installed, thus the cutter axis of rotation is held fixed relative to the body while the guide roller carrier and its carried guide rollers move in a plane normal to the cutter axis.

In use of the device, the operator examines the protuberance to be shaved off the work surface to determine the depth of cut ot be made by the cutter wheel 50. The operator then rotates the lock nut 17 to move it upwardly beyond the desired setting and then rotates the sleeve 20 to the desired pre-setting position, which may be determined by reference to conventional calibrations (not shown) on the lock ring and sleeve, after which the parts are locked in said position by rotating the lock nut to move it and the lock ring downwardly into sleeve locking position. This causes the guide ring carrier to be protracted until the work surface engaging portions of the peripheral surfaces of the guide rollers are spaced outwardly beyond the periphery of the cutter wheel a distance equal to the depth of the cut to be made. Then by pressing the cutter against the protuberance and the guide rollers against the adjoining work surface and starting the motor, the cutter wheel will proceed to shave off the protuberance until the guide rollers and cutter wheel are in axial alignment. Thereafter the guide rollers will prevent the cutter wheel from making any deeper cut in the work surface. Inasmuch as both the guide rollers are always in axial alignment and are of the same outer diameter, which diameter is equal to the outer diameter of the cutter wheel, it is assured that the shaved surface will be coplanar with the adjoining work surface.

I claim:

1. A milling tool for shaving a protuberance from a work surface, comprising a body having a handle portion at its inner end, a power actuated drive shaft in said body, a cutter wheel shaft journaled in the outer end portion of said body for rotation about a fixed axis perpendicular to the principal axis of said body, a cutter wheel secured on said shaft, means operatively connecting said cutter wheel shaft to said drive shaft, a single guide roller carrier resiliently telescopically mounted in the outer end portion of said body, a pair of guide rollers rotatably carried by said carrier for rotation about a common axis, said guide rollers being disposed respectively at opposite sides of said cutter wheel and each having an axial bore of larger diameter than and through which said cutter wheel shaft extends, and cooperative means carried by said body and guide roller carrier for adjustably moving said carrier to a preset position relative to said body and in a direction normal to the axis of rotation of said cutter wheel shaft; said guide roller carrier being further movable from its said preset position relative to said body to the extent of the difference between the diameters of said cutter wheel shaft and said guide roller bores in response to pressural engagement of said guide rollers with said work surface.

2. The tool of claim 1 wherein each of said guide rollers has an outer diameter substantially equal to the outer diameter of said cutter wheel.

3. The tool of claim 1 wherein said last-mentioned means includes an internally threaded sleeve threadedly carried by the outer end portion of said body and an externally threaded member carried by said guide roller carrier in threaded engagement with said sleeve.

4. The tool of claim 3 wherein said body is externally splined and which additionally includes a lock nut threadedly carried by said body and an internally splined lock ring slidably carried by said body between said sleeve and said lock nut with its splines intermeshing with said splines of said body.

5. A milling tool for shaving a protuberance from a work surface comprising a body having a handle portion at its inner end and bifurcations at its outer end, a power actuated drive shaft in said body, a cutter wheel shaft journaled at its ends in said bifurcations for rotation about an axis transverse the longitudinal axis of said body, a cutter wheel secured on said shaft, means operatively connecting said cutter wheel shaft to said drive shaft, a single guide roller carrier telescopically mounted between said bifurcations, a pair of guide rollers rotatably carried by said carrier and disposed respectively at opposite sides of said cutter wheel about said cutter wheel shaft, each of said guide rollers having an axial bore of larger diameter than the diameter of said cutter wheel shaft and through which bores said cutter wheel shaft extends, spring means interposed between said body and said guide roller carrier and yieldably urging said guide roller carrier outwardly between and relative to said bifurcations, and interengaging threaded means carried by said body and by said guide roller carrier for moving said guide roller carrier into a preset position; said guide roller carrier being further movable against the pressure of said spring means from its said preset position relative to said body to the extent of the difference between the diameters of said cutter wheel shaft and said guide roller bores in response to pressural engagement of said guide rollers with said work surface.

6. A milling tool for shaving a protuberance from a work surface comprising a body having a handle portion at its inner end and bifurcations at its outer end, each of said bifurcations presenting an outwardly opening semi-circular bearing surface disposed transversely of the principal axis of said body, a retainer plate secured on the outer end of each of said bifurcations and each presenting a transversely disposed semi-circular bearing surface registering with said first-mentioned bearing surfaces, a cutter wheel shaft journaled at its ends in said registering bearing surfaces for rotation about an axis diametrically of said body, a cutter wheel secured on said shaft, means operatively connecting said cutter wheel shaft to said drive shaft, a single guide roller carrier telescopically mounted between said bifurcations, a pair of guide rollers rotatably carried by said carrier and disposed respectively at opposite sides of said cutter wheel about said cutter wheel shaft, each of said guide rollers having an axial bore of larger diameter than the diameter of said cutter wheel shaft and through which bores said cutter wheel shaft extends, spring means interposed between said body and said guide roller carrier and yieldably urging said guide roller carrier outwardly between and relative to said bifurcations, and interengaging threaded means carried by said body and said guide roller carrier for moving said guide roller carrier into a preset position; said guide roller carrier being further movable against the pressure of said spring means from its said preset position relative to said body to the extent of the difference between the diameters of said cutter wheel shaft and said guide roller bores in response to pressural engagement of said guide rollers with said work surface.

References Cited in the file of this patent
UNITED STATES PATENTS

| | | |
|---|---|---|
| 1,708,097 | Johnston | Apr. 9, 1929 |
| 2,393,463 | Gottlieb | Jan. 22, 1946 |
| 2,625,860 | Plester | Jan. 20, 1953 |
| 2,910,920 | Bidart | Nov. 3, 1959 |
| 2,919,631 | Skaran | Jan. 5, 1960 |